United States Patent Office 3,040,841
Patented June 26, 1962

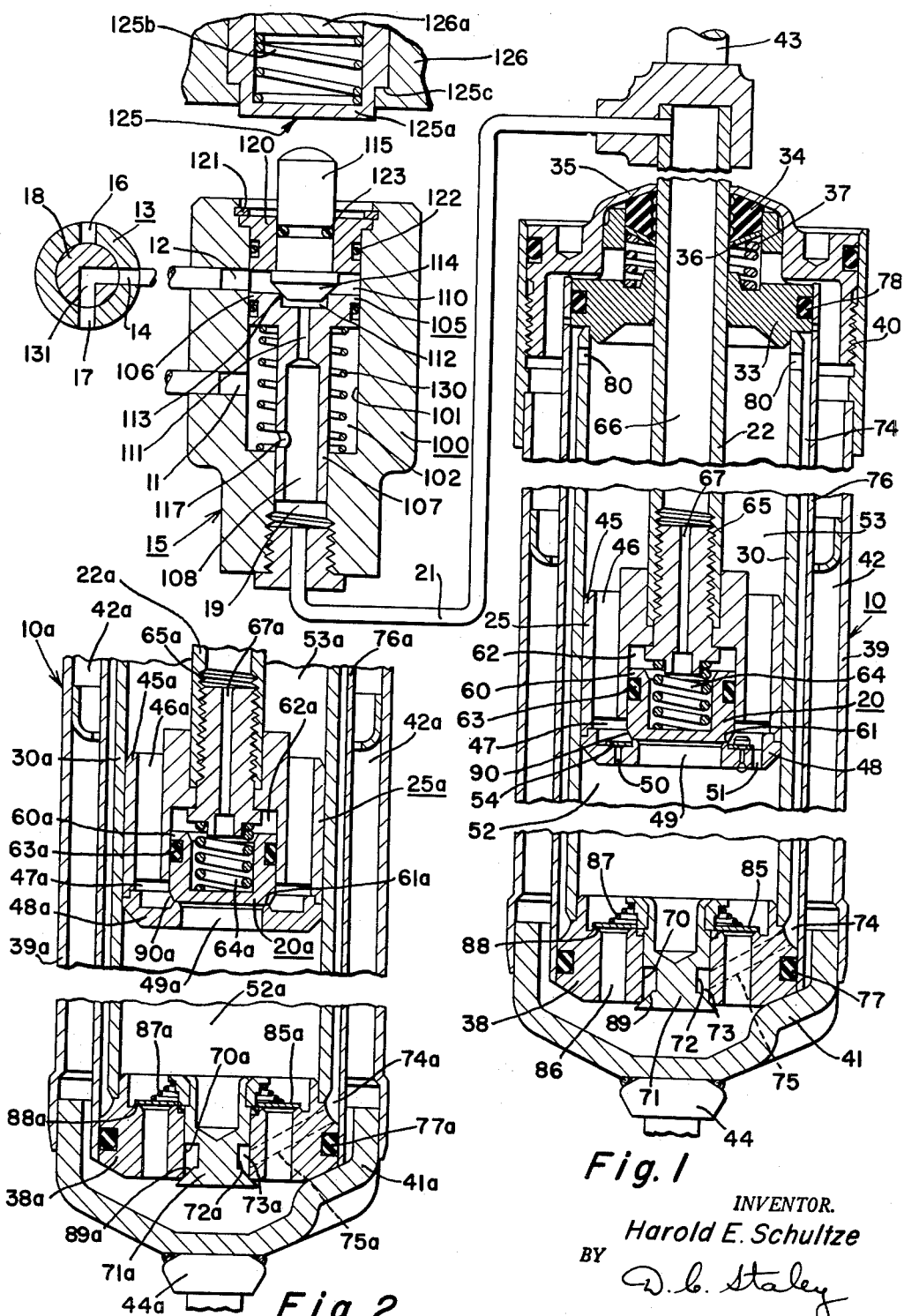

3,040,841
HYDRAULIC LOCK-OUT CONTROL SYSTEM
Harold E. Schultze, Dayton, Ohio, assignor to General Motors Corporation, Detroit, Mich., a corporation of Delaware
Filed Oct. 6, 1960, Ser. No. 60,852
7 Claims. (Cl. 188—88)

This invention relates to a shock absorbing system, including a shock absorber and a control means for the same, that is adapted for use to control relative movement between the sprung mass and the unsprung mass of a vehicle.

It is an object of the invention to provide a shock absorbing system, including a shock absorber and a control means for the same, wherein at least some of the resistance valving incorporated in the shock absorber for energy dissipation and control of hydraulic fluid flow internally of the shock absorber is controlled by fluid pressure applied from force external of the shock absorber, a suitable control means being provided to control and regulate the application of fluid pressure from the external source to the resistance valving of the shock absorber to render it effective resiliently, or to retain the resistance valving firmly on its seat by a hydraulic lock to produce a very high resistance effect in the shock absorber, such as may be required near the end of a compression stroke of the shock absorber.

It is another object of the invention to provide a control means for a shock absorbing system of the kind set forth in the foregoing object wherein the control means is adapted to control the application of a low pressure fluid source to the resistance valving of the shock absorber, the control means being constructed and arranged in a manner that it is actuated by a predetermined proximity of approach of the sprung mass relative to the unsprung mass of the vehicle in a manner that hydraulic fluid from the low pressure fluid source will be locked between the control means and the resistance valving of the shock absorber controlled by the low pressure fluid source so that the resistance valving will be retained firmly on its seat at the time there is close proximity of approach of the sprung mass relative to the unsprung mass of the vehicle so that a very high resistance is applied to movement between the masses by the shock absorber in the last part of its compression stroke when the sprung mass of the vehicle is closely approaching the unsprung mass of the vehicle.

It is another object of the invention to provide a control means for the shock absorbing system set forth in the foregoing objects wherein the control means includes a valve means actuated by a resiliently acting spring means on approach of the sprung means relative to the unsprung means which retains the control means in position to lock the hydraulic fluid between the control means and the resistance valving of the shock absorber with increasing force effect as the sprung and unsprung masses approach one another.

It is a still further object of the invention to provide a shock absorbing system including a shock absorber and a control means for the same incorporating the features of the foregoing objects wherein the control means is also adapted for connection to a high pressure fluid source that may be either manually or automatically controlled for application to the resistance valving of the shock absorber to overcome the effect of the low pressure fluid source and thereby hold the resistance valving firmly on its seat to give a high resistance effect for energy dissipation in the shock absorber or to hydraulically lock the shock absorber in a fixed position so long as the high pressure fluid is applied to the resistance valving, the control means controlling both the high pressure and the low pressure fluid sources being constructed and arranged in a manner that when the high pressure fluid source is rendered effective, the control means will automatically disconnect the low pressure fluid source.

Further objects and advantages of the present invention will be apparent from the following description, reference being had to the accompanying drawings wherein preferred embodiments of the present invention are clearly shown.

In the drawings:

FIGURE 1 is a somewhat schematic illustration of a shock absorbing system including a shock absorber and a control means for the same incorporating features of this invention.

FIGURE 2 is a cross-sectional view of a modified arrangement of the shock absorber illustrated in FIGURE 1.

In this invention the shock absorbing system includes a shock absorber 10 and a fluid flow control means 15 that has a low pressure fluid inlet port 11 and a high pressure fluid inlet port 12. The port 11 of the control means 15 is adapted to be connected to any suitable low pressure fluid source, or low pressure hydraulic source, that is adapted to supply a fluid or hydraulic pressure on the order of ten pounds per square inch. The high pressure fluid port 12 of the control means is adapted to be connected to a suitable source of fluid pressure or hydraulic pressure that has a high pressure value on the order of one thousand pounds per square inch. The low pressure fluid source may be connected continuously with the inlet port 11 of the control means 15, but preferably the high pressure fluid or hydraulic source is controlled by a manual or automatically operated valve 13 that can connect a port 14 with either a high pressure fluid or hydraulic inlet port 16 or an exhaust port 17 by rotation of the valve element 18. Thus the port 12 of the control means 15 is adapted for connection either to a high pressure fluid port 16 or an atmosphere port 17 of the valve 13.

The control means 15 has an outlet port 19 that is connected with the resistance valving 20 of the shock absorber by means of a conduit 21 and a hollow rod 22 that connects with the piston 25 of the shock absorber that carries the resistance valving 20 in a manner hereinafter described. Thus, either the low pressure fluid or hydraulic source or the high pressure fluid or hydraulic source can be selectively applied to the resistance valving 20 to retain it on its seat resiliently when the low pressure fluid source is applied to the resistance valving and to retain the valving 20 firmly on its seat when the high pressure fluid or hydraulic source is applied thereto.

The shock absorber 10 comprises a cylinder 30 having a piston 25 reciprocable in the cylinder. The piston 25 is carried on one end of the operating rod 22 that projects through a rod guide member 33 secured on one end of the cylinder 30, and which closes that end of the cylinder. The operating rod 22 projects through the rod guide member 33 and is provided with a resilient seal 34 around the operating rod 22.

The seal 34 is carried between a cap member 35 and a retainer 36 that is held under pressure against the seal by a compression spring 37.

The opposite end of the cylinder 30 is closed by a closure member 38 secured to the cylinder 30. A cylinder wall 39 encloses the pressure cylinder 30 and depends from the cap 35 as secured thereto by the threaded connection 40. The cylinder 39, together with the end cap 41, forms a reservoir chamber 42 for hydraulic fluid circulated in the pressure cylinder 30 in a manner hereinafter described. The operating rod 22 carries a mounting fitting 43 while the cap 41 carries a mounting fitting 44 whereby the shock absorber can be connected between the sprung mass and the unsprung mass of a vehicle, relative movement between the sprung mass and the unsprung mass producing reciprocation of the piston 25 in the cylinder 30 and being controlled by the resistance valving 20.

The piston 25 comprises a cylindrical body member 45 that has a plurality of longitudinally extending passages 46 therein terminating in a recess chamber 47 at one end of the body 45. The recess chamber 47 is closed by means of a cover plate 48 having a central opening 49 through which hydraulic fluid flows through the piston between opposite ends of the cylinder 30 upon reciprocation of the piston 25 in the cylinder.

The cover plate 48 is provided with one or more orifice passages 50 and 51 to permit controlled flow of fluid by the orifice passages from the cylinder chamber 52 on one side of the piston to the cylinder chamber 53 on the opposite side of the piston. The orifice passages 50 are closed by a valve 54 to prevent flow of hydraulic fluid from the cylinder chamber 53 to the cylinder chamber 52, orifice passages 51 always being open.

The main flow passage 49 in the piston 25 is controlled by a valve piston 60 that seats upon a valve seat 61 provided around the periphery of the opening 49, this piston 60 and its seat 61 forming the resistance valving means 20. The valve piston 60 slides within a fluid receiving chamber 62 disposed axially in the piston 25, an O-ring seal 63 being provided between the piston valve 60 and the wall of the chamber 62. A compression spring 64 disposed between the piston valve 60 and the retainer member 65 normally urges the valve 60 upon its seat 61.

The operating rod 22 has a longitudinally extending fluid conducting passage 66 provided therein, and the retainer member 65 has the passage 67 to provide for delivery of fluid under pressure from the passage 66 into the chamber 62 in the piston 25 in a manner hereinafter described.

The closure member 38 on the lower end of the cylinder 30 has an axial bore 70 in which a valve 71 is slidably positioned. The valve 71 has an annular recess 72 to provide a chamber 73. The chamber 73 is connected with a cylindrical chamber 74 by means of a conduit passage 75.

The chamber 74 is formed by means of a tube 76 surrounding the cylinder 30 and projecting over the outer peripheries of the closure members 38 and 33 at opposite ends of the cylinder 30. O-ring seals 77 and 78 engage the cylinder 76 and thereby close the chamber 74.

The upper cylinder chamber 53 of the shock absorber connects with the chamber 74 through means of a passage 80 provided in the upper end of the cylinder 30 whereby flow of fluid can be conducted from the cylinder chamber 53 through the passages 80 and the chamber 74, and through chamber 75 to the chamber 73 around the valve 71 in the closure member 38. The valve 71 is encircled by a valve member 85 that closes a plurality of passages 86 disposed around the bore 70. A light compression spring 87 is confined between the valve member 71 and the valve member 85 to retain the valve member 85 upon its seat 88 and retain the valve seat 89 of the valve 71 seated on the edged periphery of the bore 70 in the closure member 38.

On the compression stroke of the shock absorber, that is when the piston 25 moves toward the closure member 38, the hydraulic fluid in chamber 52 is placed under pressure. Pressure of the fluid in chamber 52 causes valve member 71 to move downwardly and thereby open chamber 73 to the reservoir chamber 42. As the piston 25 moves downwardly, hydraulic fluid under pressure in the chamber 52 first passes through the restricted orifices 50 and 51, valve 54 opening at this time. As the pressure in chambers 52 continues to build up as a result of downward movement of the piston 25 toward the closure member 38, the piston valve 60 will be lifted from its seat so that there is then a major flow of hydraulic fluid from the cylinder chamber 52 into cylinder chamber 53. Excess volume of hydraulic fluid equal to displacement of rod 22 passing from the cylinder chamber 52 into the cylinder chamber 53 and discharging from chamber 53 through passages 80 and the chamber 74 and passage 75 through the now open valve 71 into the reservoir chamber 42.

On the rebound stroke of the shock absorber, that is when the piston 25 is moving toward the closure member 33 and away from closure member 38, hydraulic fluid in cylinder chamber 53 will be placed under pressure. As the fluid is placed under the pressure in chamber 53, the effect of the pressure will be transmitted through the passage 80, chamber 74 and passage 75 through the chamber 73 around valve 71 in closure member 38. Since the annular recess 72 forming the chamber 73 has equivalent areas exposed to the pressure of the hydraulic fluid in chamber 73, valve 71 is hydraulically balanced and the spring 87 will hold valve 71 in closed position as shown in FIGURE 1.

Hydraulic fluid under pressure in cylinder chamber 53 will thus be required to flow first through the orifice passages 51 in the head of piston 25, valve 54 being closed. As the pressure continues to build up in chamber 53, the effect of the pressure will react on a reaction area 90 of the valve 60 to raise it against the force of the spring 64 and thereby allow flow of hydraulic fluid from chamber 53 into chamber 52 under control of the orifices 51 and valve 60.

As piston 25 moves away from closure member 38, the volume of hydraulic fluid transferred from chamber 53 to chamber 52 is less than the increasing volume of chamber 52. Thus valve member 85 raises against the light pressure of spring 87 to permit hydraulic fluid to flow through the passages 86 into chamber 52 from reservoir 42 to retain chamber 52 completely filled with hydraulic fluid.

Spring 64 that urges valve 60 in its seat is a relatively light spring so that a relatively low fluid pressure in chambers 52 or 53 could effect opening movement of valve 60.

However, primary control of opening of valve 60 is regulated by admission of low pressure hydraulic fluid into the hollow interior 66 of rod 22 under control of the valve means 15 heretofore mentioned. Also, the valve means 15 selectively controls admission of high pressure hydraulic fluid into the hollow rod 22 for application to the piston member 60 of the resistance valving 20. When low pressure hydraulic fluid is applied into the chamber 62, thereby acting on piston 60, the valve piston can be lifted from its seat by internal pressures in the shock absorber on either compression or rebound stroke, determined substantially entirely by the value of the low pressure hydraulic fluid source. However, when the high pressure hydraulic fluid source, on the order of one thousand pounds per square inch, is applied into chamber 62, the piston valve 60 will be held firmly on its seat so that there will be no flow of hydraulic fluid on either compression or rebound stroke through the main flow passage 49 in the head of the piston 25, flow occuring at this time only through the orifice passages 50 or 51.

The control valve 15 comprises a valve body 100 having an axial bore 101 forming a chamber 102. Outlet port 19 connects with the chamber 102 as does inlet ports 11 and 12. The axial bore 101 receives a piston member 105 having the piston head portion 106 and a reduced diameter portion 107. The piston head portion 106 is slidable in the bore 101 and the reduced diameter 107 is slidable in the port 19, whereby a chamber is provided between the head of the piston and the bottom wall portion of a chamber 102. The piston member 105 has an axial port 108 that provides fluid connection between the outlet port 19 and the chamber space 110 above the piston head 105 through the axial passage 111 and the recess chamber 112 that forms a valve seat 113 engageable with the valve head 114 on the lower end of the plunger member 115. The chamber space 110 is in fluid connection with the high pressure inlet port 12. One or more ports 117 are provided in the reduced diameter portion 107 of the piston member 105 for fluid communication between the chamber space 102 and the outlet port 19 so that the low pressure fluid source can be connected through the inlet port 11, chamber space 102, port 117, passage 108 with the outlet port 19.

The plunger 115 is slidably mounted in a guide member 120 that is held in position by a snap ring 121. An O-ring seal member 122 is provided around the guide member 20 and the plunger 115 is provided with an O-ring seal 123.

The control means 15 is adapted for mounting on one of the movable masses of a vehicle with the plunger 115 adapted to engage a bump stop member 125 carried on the other of the movable masses. For example, the control valve means 15 can be mounted on the unsprung mass of the vehicle with the bump stop 125 being positioned on the sprung mass 126. The bump stop consists of a plunger 125a urged by the compressed spring 125b against the stop shoulder 125c, member 126a being fixed with the sprung mass 126. Under this condition, relative movement between the sprung and unsprung mass will normally cause no movement of the plunger 115 relative to the valve body 100, but when the sprung mass and the unsprung mass of the vehicle reach a predetermined close proximity of approach, the plunger 115 will engage the plunger 125a to urge the plunger 115 downwardly by reason of the force effect of spring 125b into the body 100 and thereby move the piston member 105 downwardly until the port 117 enters the outlet port 19 to cut off fluid connection between the low pressure inlet port 11 and the outlet port 19 of the control valve 15. This operation of the control valve 15 locks hydraulic fluid in the conduit 21 and in the hollow interior of the rod 22 so as to lock the hydraulic fluid column on the piston member 60 of the resistance valving 20 to firmly retain the piston member 60 on its seat 61. Obviously the control valve member 15 could be mounted on the sprung mass of the vehicle and the bump stop 125 could be on the unsprung mass of the vehicle, the valve functioning the same regardless of whether the bump stop is on the sprung mass or the unsprung mass of the vehicle. Engagement of the bump stop 125 by the plunger 115 of the control means 15 occurs during the last part of the compression stroke of the shock absorber as the piston 25 approaches the end wall 38 of the shock absorber so as to produce a high frictional resistance internally in the shock absorber which resists the relative movement between the sprung mass and the unsprung mass of the vehicle to a much greater degree in the last part of the compression stroke of the shock absorbed.

Under normal conditions of operation of the shock absorbing system, the component parts of the control valve means 15 will be in the positions illustrated in FIGURE 1 so that the low pressure hydraulic fluid source is connected with the hollow chamber 66 of the rod 22, thereby applying a low pressure hydraulic fluid into the chamber 62 in the shock absorber piston 25 to hold the piston valve 60 on its seat 61 with a resiliently acting hydraulic fluid pressure of a relatively low value, usually on the order of about ten pounds per square inch. Under this condition of operation, the shock absorber will function in both compression and rebound stroke in the manner heretofore described with the piston 60 being lifted from its seat 61 against the action of the low pressure hydraulic fluid source for normal damping operation by the shock absorber.

However, when a severe movement occurs between the sprung mass and the unsprung mass of the vehicle such as causes the plunger 115 to strike the bump stop 125, the plunger 115 will move inwardly into the body 100 of the valve 15 to cause the piston member 105 to move downwardly and place the port 117 within the port 19 so that fluid communication is broken between the low pressure inlet port 11 and the outlet port of the control valve 15. This action of the control valve 15 locks hydraulic fluid in the conduit 21 and in the chamber space 66 of the hollow rod 22 so that the piston 60 will be hydraulically locked on its seat 61.

Under this condition, therefore, the only fluid flow on the compression stroke of the shock absorber between opposite sides of the piston 25 will be through the orifices 50 and 51 so that a high degree of resistance is imparted to movement of the piston 25 downwardly toward the closure member 38 in the latter part of the stroke of operation of the shock absorber, that is whenever the plunger 115 engages the bump stop 125.

As the sprung and unsprung masses move closer togther, plunger 115 urges plunger 125a upwardly against the compressive force of spring 125b. This action results in increasing the force effect holding valve 114 on its seat 113 to offset pressure rise in chamber 52 while valve 60 is being held on its seat by the body of fluid locked in chamber 62.

Under certain conditions of operation, it is desirable that the resistance valving 20 be held firmly in closed position, that is piston valve 60 being held firmly on its seat 61 so that a high degree of resistance to reciprocation of the piston 25 in the cylinder 30 is created. This can be occasioned by rotating the valve member 18 so as to place the passage 131 in communication between the high pressure hydraulic fluid inlet port 16 and the valve 13 and the port 14 so that high pressure hydraulic fluid is applied to the inlet port 12 of the valve 15. As previously mentioned this high pressure hydraulic fluid can be on the order of one thousand pounds per square inch, or whatever pressure is desired to hold the piston member 60 on its seat 61 and thereby prevent opening of the main fluid flow passage 49 in the shock absorber piston 25.

When the high pressure fluid source is applied to the inlet port 12, the piston member 105 is moved downwardly to place port 117 in port 19 and thereby cut off port 11 from port 19 so that the high pressure fluid source will be connected directly from the inlet port 12 to the outlet port 19 through ports 111 and 108.

Operation of the valve 13 can either be manual under control of the operator of the vehicle, or it can be automatic under any suitable controls. However, so long as the high pressure fluid source is connected directly with the inlet port 12, the connection with the low pressure fluid source through port 11 is completely cut off, the high pressure fluid moving piston 105 to override or overrule any operation of the control device by means of the plunger 115. Under this condition of operation the shock absorber will give a very high resistance to relative movement between the sprung mass and the unsprung mass of the vehicle as controlled solely by the orifices 50 and 51 in the piston head 48 of the shock absorber piston 25.

It may be desirable under some conditions of operation of the vehicle to provide for a complete hydraulic lock of the movement of the shock absorber piston 25 in its cylinder 30 so that no relative movement can occur between the sprung mass and the unsprung mass of the vehicle, in other words, place the vehicle in a completely rigid condition insofar as movement between the sprung mass and the unsprung mass is concerned. Under this condition, the shock absorber can be constructed as shown in FIGURE 2 wherein the piston head 48a of the piston 25a is a solid piston head except for port 49a. It will be noticed that in FIGURE 2 the orifice passages 50 and 51 are eliminated in the piston head 48a as is the valve 54. Therefore, all hydraulic fluid placed under pressure either in chamber 52 or in chamber 53 must pass through the central passage 49a since all other ports of the shock absorber of FIGURE 2 are identical with the corresponding parts of that disclosed in FIGURE 1, they bear the same numeral as the corresponding part in FIGURE 1.

In the shock absorber of FIGURE 2, when the low pressure fluid source from the control valve 15 is applied within the chamber 62 in the shock absorber piston 25a, all of the hydraulic fluid in the chambers 52 and 53 must pass through the central opening 49a against the action of the single valve 60 so that the low pressure hydraulic fluid source becomes the controlling factor for opening of the valve 60 from its seat 61 on either compression or rebound stroke of the shock absorber piston 25a.

Also, when the plunger member 115 of the control valve 15 engages the bump stop on the vehicle as a result of the close predetermined proximity of approach of the sprung mass relative to the unsprung mass, the movement of the port 117 into the port 19 of control valve 15 will fully lock hydraulic fluid in the conduit 21, the internal hollow portion 66 of rod 22 and chamber space 62 with the result that the piston valve 60 is firmly retained on its seat 61, hydraulic fluid being thereby completely locked in the compression space 52 of the shock absorber at this time.

When the high pressure hydraulic fluid source is applied to the inlet port 12 of the control means or control valve 15, and piston 105 is moved downwardly to place port 117 in port 19 and thereby open direct communication from the high pressure inlet port 12 to the outlet port 19, the piston valve 60 will be held firmly on its seat 61 by the high pressure fluid source. Since the piston head 48a has no passages through it except for the passage 49a that is now held closed by the piston valve 60 by the high pressure fluid source, the piston 25a of the shock absorber will be hydraulically blocked against movement in the shock absorber cylinder 30 in either direction, the high pressure fluid source being sufficiently high as to retain the piston valve 60 on its seat 61 against any desired conditions of operation of the vehicle that may be required to have the vehicle remain in a rigid condition insofar as movement of the sprung mass relative to the unsprung mass is concerned. The value of the high pressure source may be selected at any desired value depending upon operating conditions that will be met by the vehicle.

While the embodiment of the invention as herein disclosed constitutes a preferred form, it is to be understood that other forms might be adopted.

What is claimed is as follows:

1. A shock absorbing system for use to damp relative movement between the sprung mass and the unsprung mass of a vehicle, comprising in combination, a movement damping apparatus disposed between the sprung mass and the unsprung mass of a vehicle including an energy absorbing mechanism including resistance valve means engaging its seat and operable to effect energy absorption upon relative movement between the sprung mass and the unsprung mass on an energy dissipating stroke of the damping apparatus, a first source of fluid pressure operably connected with said energy absorbing mechanism to apply fluid pressure to said valve means to hold it on its seat resiliently, a second source of fluid pressure greater than said first source operably connected with said energy absorbing mechanism to apply fluid pressure to said valve means to hold it on its seat firmly, a fluid flow control means controlling application of fluid pressure from either of said sources to said resistance valve means having one position providing for application of fluid pressure from said first source to said resistance valve means to resiliently hold said resistance valve mean on its seat and a second position cutting off fluid connection of said resistance valve means with said first source and locking fluid thereby between said control means and said resistance valve means to resist movement of the resistance valve means from its seat by the so-locked body of fluid, said control valve means being in fluid connection with said second source and actuated thereby to position the said control valve means in its second position during application of fluid pressure thereto from said second source, said control valve means also including means providing a fluid conducting passage connecting said second source with said resistance valve means of said energy absorbing mechanism during application of fluid pressure thereto from said second source to retain said resistance valve firmly on its seat during the application of fluid pressure thereto from said second source.

2. A shock absorbing system constructed and arranged in accordance with claim 1 wherein fluid pressure from said second source overrides the effect of fluid pressure from said first source thereby to place said control valve means in its second position.

3. A shock absorbing system constructed and arranged in accordance with claim 1 wherein application of fluid pressure from said second source on said control valve means retains said resistance valve means of said energy absorbing mechanism on its seat during compression and rebound strokes of the same so long as fluid pressure from said second source is applied to said resistance valve means.

4. A shock absorbing system constructed and arranged in accordance with claim 1 which includes separate means controlling application of fluid pressure from said second source to said fluid flow control means.

5. A shock absorbing system constructed and arranged in accordance with claim 1 which includes separate means controlling application of fluid pressure from said second source to said fluid flow control means and has one position connecting said source with said fluid flow control means and a second position connecting said fluid flow control means to atmosphere.

6. A shock absorbing system for use to damp relative movement between the sprung mass and the unsprung mass of a vehicle, comprising in combination, a movement damping apparatus disposed between the sprung mass and the unsprung mass of a vehicle including an energy absorbing mechanism including resistance valve means engaging a seat and operable to effect energy absorption upon relative movement between the sprung mass and the unsprung mass on an energy dissipating stroke of the damping apparatus, a source of fluid pressure operably connected with said energy absorbing mechanism to apply fluid pressure to said resistance valve means to hold it on its seat and control thereby the energy absorbing effectiveness of the energy absorbing mechanism, and a fluid flow control means operatively connected with and controlling application of fluid pressure from said source to said resistance valve means having one position providing for application of fluid pressure from said source to said resistance valve means to resiliently hold said resistance valve means on its seat and actuated by relative movement between the sprung mass and the unsprung mass of the vehicle on predetermined proximity of approach of the said masses to place said control means in a second position as the movement damping apparatus approaches the end of its compression stroke locking fluid between said control means and said resistance valve means to resist movement of the control valve means from its seat by the so-locked body of fluid to effect thereby high resistance locking of the movement damping apparatus at the end of its compression stroke.

7. A shock absorbing system for use to damp relative movement between the sprung mass and the unsprung mass of a vehicle, comprising in combination, a movement damping apparatus disposed between the sprung mass and the unsprung mass of a vehicle including an energy absorbing mechanism including resistance valve means engaging a seat and operable to effect energy absorption upon relative movement between the sprung mass and the unsprung mass on an energy dissipating stroke of the damping apparatus, a source of fluid pressure operably connected with said energy absorbing mechanism to apply fluid pressure to said resistance valve means to hold it on its seat and control thereby the energy absorbing effectiveness of the energy absorbing mechanism, and a fluid flow control means including control valve means operatively connected with said resistance valve means and engaging compression spring means on predetermined relative movement between the sprung and unsprung masses holding said control valve means closed thereby with increasing spring force on continued relative movement of the said masses toward one another, said control means controlling application of fluid pressure from said source to said resistance valve means having one position providing for application of fluid pressure from said source to said resistance valve means to resiliently hold said resistance valve means on its seat and actuated by relative movement between the sprung mass and the unsprung mass of the vehicle on predetermined proximity of approach of the said masses to place said control means in a second position locking fluid between said control means and said resistance valve means to resist movement of the control valve means from its seat by the so-locked body of fluid.

References Cited in the file of this patent

UNITED STATES PATENTS

| | | |
|---|---|---|
| 2,181,161 | Wolf | Nov. 28, 1939 |
| 2,308,404 | Thornhill | Jan. 12, 1943 |
| 2,592,656 | Catranis | Apr. 15, 1952 |
| 2,653,682 | Whisler et al. | Sept. 29, 1953 |
| 2,698,068 | Hein | Dec. 28, 1954 |
| 2,718,285 | Largay | Sept. 20, 1955 |
| 2,869,685 | Funkhouser et al. | Jan. 20, 1959 |

FOREIGN PATENTS

| | | |
|---|---|---|
| 341,030 | Great Britain | Jan. 6, 1931 |